United States Patent
Kudo et al.

(10) Patent No.: US 10,886,578 B2
(45) Date of Patent: Jan. 5, 2021

(54) BATTERY MANAGEMENT DEVICE

(71) Applicant: HITACHI AUTOMOTIVE SYSTEMS, LTD., Ibaraki (JP)

(72) Inventors: Akihiko Kudo, Hitachinaka (JP);
Tomonori Kanai, Hitachinaka (JP);
Tomoyuki Arima, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 355 days.

(21) Appl. No.: 15/754,199

(22) PCT Filed: Aug. 8, 2016

(86) PCT No.: PCT/JP2016/073223
§ 371 (c)(1),
(2) Date: Feb. 21, 2018

(87) PCT Pub. No.: WO2017/043237
PCT Pub. Date: Mar. 16, 2017

(65) Prior Publication Data
US 2018/0241100 A1 Aug. 23, 2018

(30) Foreign Application Priority Data
Sep. 11, 2015 (JP) .................. 2015-179359

(51) Int. Cl.
*H01M 10/48* (2006.01)
*H01M 10/42* (2006.01)
(Continued)

(52) U.S. Cl.
CPC ........... *H01M 10/482* (2013.01); *B60L 58/21* (2019.02); *H01M 2/34* (2013.01);
(Continued)

(58) Field of Classification Search
CPC ........... H01M 10/482; H01M 10/4207; H01M 10/4264; H01M 2/34; B60L 58/21; H02J 7/0026; H02J 7/02
See application file for complete search history.

(56) References Cited

U.S. PATENT DOCUMENTS

| 2014/0225622 A1 | 8/2014 | Kudo et al. |
| 2015/0155722 A1 | 6/2015 | Kudo et al. |

FOREIGN PATENT DOCUMENTS

| JP | 2012-004856 A | 1/2012 |
| JP | 2012004856 | * 1/2012 |

(Continued)

OTHER PUBLICATIONS

Apogeeweb, What is the Current Limiting Resistor and Its Function:, Current Limiting Resistor, http://www.apogeeweb.net/article/228.html. (Year: 2019).*

(Continued)

*Primary Examiner* — Jayne L Mershon
(74) *Attorney, Agent, or Firm* — Volpe Koenig

(57) ABSTRACT

Even when a service disconnect switch is opened, an integrated circuit connected to single battery cells are operated. The cell controller is provided with: the integrated circuits; a signal transmission path through which a signal is transmitted between the integrated circuits via the capacitors; and the connection circuit. The first integrated circuit is provided corresponding to the first cell group electrically connected to one side of the SD-SW, and the second integrated circuit is provided corresponding to the second cell group electrically connected to one side of the SD-SW. The connection circuit AC-couples the ground terminal GND of the first integrated circuit to the ground terminal GND of the second integrated circuit through the capacitor.

5 Claims, 6 Drawing Sheets

(51) Int. Cl.
    H01M 2/34      (2006.01)
    H02J 7/02      (2016.01)
    B60L 58/21     (2019.01)
    H02J 7/00      (2006.01)
(52) U.S. Cl.
    CPC ... *H01M 10/4207* (2013.01); *H01M 10/4264* (2013.01); *H01M 10/48* (2013.01); *H02J 7/0026* (2013.01); *H02J 7/02* (2013.01); *B60L 2240/54* (2013.01); *H01M 2010/4271* (2013.01); *H01M 2220/20* (2013.01); *Y02T 10/70* (2013.01); *Y10S 903/907* (2013.01)

(56) References Cited

FOREIGN PATENT DOCUMENTS

| | | |
|---|---|---|
| JP | 2012-074333 A | 4/2012 |
| JP | 2013-076602 A | 4/2013 |
| JP | 5706543 B2 | 4/2015 |
| WO | 2013/035183 A1 | 3/2013 |

OTHER PUBLICATIONS

Fitzpatrick, Capacitors in Series and in Parallel, University of Texas, Lectures, Http://farside.ph.utexas.edu/teaching/3021/lectures/node46.html (Year: 2007).*

Extended European Search Report dated Jan. 25, 2019 for the European Patent Application No. 16844101.2.

International Search Report for WO 2017/043237 A1, dated Nov. 8, 2016.

* cited by examiner

BATTERY MANAGEMENT DEVICE

TECHNICAL FIELD

The present invention relates to a battery management device.

BACKGROUND ART

A hybrid electric vehicle (HEV) and an electric vehicle (EV) each use an assembled battery (battery system) to ensure a desired high voltage, the assembled battery (battery system) being configured by connecting, in series, a large number of single battery cells that are secondary batteries. As such an assembled battery, there is known an assembled battery in which integrated circuits for monitoring and controlling cells are provided on a cell group basis so as to perform capacity calculation, protection and management of each single battery cell (refer to PTL 1).

A middle part of the assembled battery described in PTL 1 is provided with a service disconnect switch that is used to interrupt a current path of the assembled battery to ensure the safety of an operator. When a protective inspection is performed, by opening this service disconnect switch to disconnect the serial connection of the assembled battery, the operator can be prevented from getting an electric shock even if the operator touches the highest and lowest potential terminals of the assembled battery by mistake.

CITATION LIST

Patent Literature

PTL 1: JP 5706543 B2

SUMMARY OF INVENTION

Technical Problem

In the assembled battery described in PTL 1, a communication path between two integrated circuits that are adjacent to each other is connected through a capacitor. Therefore, when the service disconnect switch is opened, grounds of the two integrated circuits, which are adjacent across the service disconnect switch, are insulated from each other. Consequently, these integrated circuits cannot be communicated with each other. Therefore, it is not possible to cause each of the integrated circuits to execute the operation such as cell voltage measurement and balancing.

Solution to Problem

A battery management device according to the present invention includes: a first integrated circuit that is provided corresponding to a first battery cell group electrically connected to one side of an interruption mechanism for interrupting an electric connection, and measures respective voltages of a plurality of battery cells constituting the first battery cell group; a second integrated circuit that is provided corresponding to a second battery cell group electrically connected to the other side of the interruption mechanism, and measures respective voltages of a plurality of battery cells constituting the second battery cell group; a signal transmission path through which a signal is transmitted between the first integrated circuit and the second integrated circuit; and a connection circuit that AC-couples a coupling target terminal of the first integrated circuit, which is electrically connected to any of the battery cells of the first battery cell group, to a coupling target terminal of the second integrated circuit, which is electrically connected to any of the battery cells of the second battery cell group, through a capacitor.

Advantageous Effects of Invention

According to the present invention, integrated circuits, each of which is connected to single battery cells, can be operated even when a service disconnect switch is opened.

DESCRIPTION OF EMBODIMENTS

Embodiments of the present invention will be described below with reference to the accompanying drawings. The embodiments described below are each taken as an example in which the present invention is applied to a battery system used for a hybrid electric vehicle (HEV) or the like. It should be noted that the present invention can be applied to not only the HEV, but also a wide variety of battery systems that are provided in a plug-in hybrid electric vehicle (PHEV), an electric vehicle (EV), a railway vehicle or like.

Examples described below assume, as an electric accumulating and discharging device that is the smallest unit of control, a lithium-ion battery having a voltage ranging from 3.0 V to 4.2 V (average output voltage: 3.6 V). However, any other device may be used so long as the device is capable of accumulating and discharging electricity, and limits the use of the device when SOC (State of Charge) is too high (overcharge) or too low (over discharge). Here, these devices are generically referred to as "single batteries" or "single battery cells".

In the embodiments described below, a cell group is constituted of a plurality of single battery cells (approximately, from several to ten and several single battery cells) that are connected in series; and a battery module is constituted of the plurality of cell groups that are connected in series. Further, an assembled battery is constituted of the plurality of cell groups, or the plurality of battery modules, which are connected in series or in series-parallel. Integrated circuits, each of which detects a cell voltage of each single battery cell and monitors and controls a battery state while performing the balancing operation, are provided on a cell group basis.

(Drive System for Hybrid Electric Vehicle)

Figure 1:
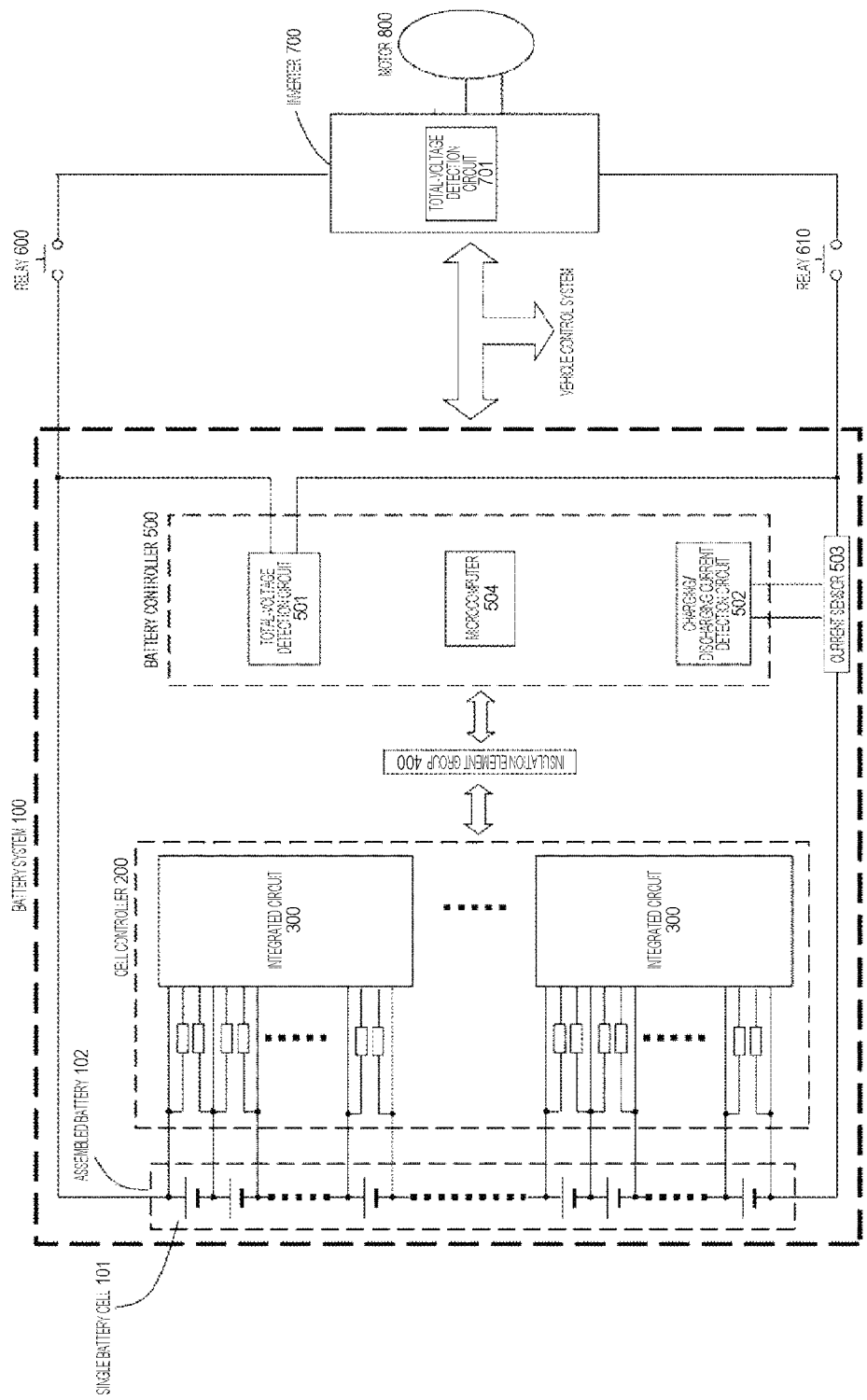
FIG. 1 is a diagram illustrating, as an example, a configuration of a hybrid electric vehicle provided with a battery system including a battery management device according to the present invention.

First of all, an example in which a battery system including a battery management device according to the present invention is applied to a drive system for a hybrid electric vehicle will be described with reference to FIG. 1. FIG. 1 is a diagram illustrating, as an example, a configuration of a hybrid electric vehicle provided with a battery system including a battery management device according to the present invention.

The battery system 100 is connected to an inverter 700 through relays 600, 610. The inverter 700 is connected to a motor 800. When a vehicle is started and accelerated, the discharge power is supplied from a battery system 100 to the motor 800 through the inverter 700 to assist an engine (not illustrated). When the vehicle stops or is decelerated, the regenerative electric power from the motor 800 is charged into the battery system 100 through the inverter 700. Incidentally, here, the inverter 700 is provided with: an inverter circuit provided with a plurality of semiconductor switching elements; a gate drive circuit of the semiconductor switching element; and a motor controller that generates a pulse signal for PWM-controlling the gate drive circuit. However, these components are omitted in FIG. 1.

The battery system 100 is mainly composed of: an assembled battery 102 that is composed of a plurality of single battery cells 101 that are lithium-ion batteries; a cell controller 200 that is provided with a plurality of battery monitoring/controlling integrated circuits 300, each of which detects a voltage of each single battery cell 101 on a cell group basis to perform the balancing discharge operation or the like; and a battery controller 500 that controls the operation of the cell controller 200 to determine a state of each single battery cell 101. In an example of the battery system 100 described in the present embodiment, 96 lithium-ion batteries, each of which has a rated capacity of 5.5 Ah and is used as the single battery cell 101, are connected in series. The battery controller 500 communicates with a plurality of integrated circuits 300 through an insulation element group 400 to control the integrated circuits 300. As described above, the integrated circuits 300 are provided on a cell group basis. The cell controller 200 uses these integrated circuits 300 to function as a battery management device that manages the assembled battery 102. It should be noted that a voltage detection line between the assembled battery 102 and the cell controller 200 is connected to the cell controller 200 by a connector (not illustrated).

The battery controller 500 is provided with: a total-voltage detection circuit 501 that measures the total voltage of the assembled battery 102; a charging/discharging current detection circuit 502 that detects a charging/discharging current flowing through the assembled battery 102 connected to a current sensor 503; and a microcomputer 504 that performs communications between the cell controller 200 and the inverter 700, and between the cell controller 200 and an upper level vehicle controller (not illustrated), and controls the battery controller 500 as a whole. It should be noted that if the total voltage of the assembled battery 102 can be measured, it is not always necessary to provide the total-voltage detection circuit 501 inside the battery controller 500 as shown in FIG. 1.

The inside of the inverter 700 is also provided with a total-voltage detection circuit 701 that detects the total voltage of the assembled battery 102. In addition, although not illustrated in FIG. 1, the battery controller 500 makes a temperature correction of a battery state parameter on basis of the temperature of the single battery cells 101, the temperature having been measured by a temperature detection circuit connected to the integrated circuit 300.

It should be noted that although omitted in FIG. 1, the cell controller 200 and the battery controller 500 are provided on one substrate, and are stored in a metal case. Moreover, the assembled battery 102 is also stored in the metal case. The cell controller 200 and the assembled battery 102 are connected to each other by using a harness that ties a plurality of voltage detection lines, connection lines of temperature sensors (not illustrated) of the single battery cells 101 and the like in a bundle.

After the battery system 100 starts up, the following operation is performed. The battery controller 500 transmits an instruction to measure an OCV (open-circuit voltage) of each single battery cell 101 to the cell controller 200 through the insulation element group 400. OCV data of the single battery cells 101, which has been measured according to this instruction, is transmitted from the cell controller 200 to the battery controller 500 through the insulation element group 400 on a cell group basis.

The battery controller 500 converts the received OCV of the each single battery cell 101 into a SOC, and calculates a deviation of the SOC of the each single battery cell 101. A single battery cell 101, the deviation of the SOC of which is larger than a predetermined value, becomes a target of balancing discharge. A length of time until the deviation of the SOC of the single battery cell 101 that has become the target of balancing discharge becomes 0 is calculated. Subsequently, an instruction to perform the control operation of causing a balancing switch in the integrated circuit 300 to be kept switched on for this length of time is transmitted from the battery controller 500 to the cell controller 200. According to this instruction, the cell controller 200 performs balancing discharge of the single battery cell 101 as the target of balancing.

After an SOC of the assembled battery 102 is calculated from the measured OCVs of the respective single battery cells 101, the inverter 700, or the vehicle controller (not illustrated) that is an upper level controller, switches on the relay 600 and the relay 610, and consequently the battery system 100 is connected to the inverter 700 and the motor 800. Subsequently, when the inverter 700 receives a charging/discharging instruction from the vehicle controller, the inverter 700 operates to drive the motor 800, and charging/discharging operation of the battery system 100 is performed.

From the time when the battery system 100 starts charging/discharging with the relay 600 and the relay 610 switched on, the battery controller 500 measures the total voltage and a charging/discharging current at regular time intervals by using the total-voltage detection circuit 501 and the charging/discharging current detection circuit 502 respectively. The battery controller 500 calculates a state of charge (SOC) and internal resistance (DCR) of the assembled battery 102 in real time from values of the obtained total voltage and the obtained charging/discharging current. Moreover, a current or electric power that can be charged/discharged by the assembled battery 102 is calculated from these values in real time, and is then transmitted to the inverter 700. The inverter 700 controls the charging/discharging current or electric power within a range of the current or the electric power.

(Connection Method in the Prior Art)

Figure 2:
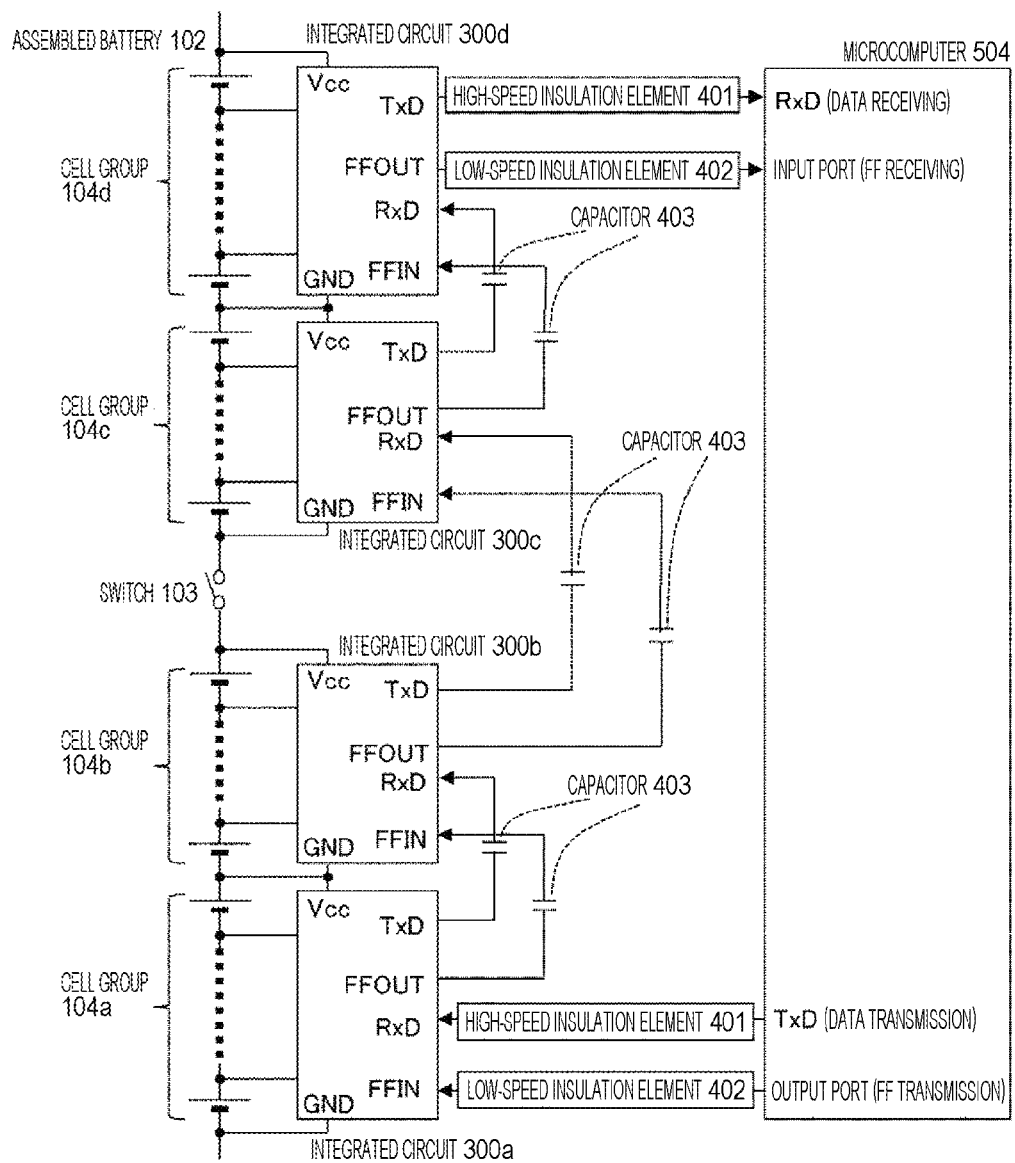
FIG. 2 is a diagram illustrating an example of communication connection based on a connection method in the prior art.

FIG. 2 is a diagram illustrating an example of communication connection between integrated circuits 300a to 300d in the cell controller 200 and the microcomputer 504 in the battery controller 500 based on a connection method in the prior art. It should be noted that the integrated circuits 300a to 300d shown in FIG. 2 correspond to the integrated circuit 300 shown in FIG. 1.

The microcomputer 504 includes: a data transmission port TXD for transmitting a command and data to the integrated circuits 300a to 300d in the cell controller 200; and an FF signal output port for outputting a data packet (FF signal) used to detect an overcharge state.

In the example shown in FIG. 2, the assembled battery 102 is provided with four cell groups 104a, 104b, 104c, 104d, each of which has a plurality of single battery cells 101 that are connected in series. In addition, a battery module in which the cell groups 104a and 104b are connected in series and a battery module in which the cell groups 104c and 104d are connected in series are configured to be arranged on the lower and upper sides of a service disconnect switch (SD-SW) 103 respectively. The number of cell groups constituting each of the battery modules is not limited to two, but may be three or more. The integrated circuits 300a, 300b, 300c, 300d are provided corresponding to the cell groups 104a, 104b, 104c, 104d respectively. It should be noted that when it is merely referred to as "integrated circuit 300" in the description below, the integrated circuits 300a to 300d are not particularly specified.

The integrated circuits 300a to 300d each include a power terminal Vcc and a ground terminal GND. The power terminals Vcc are connected to the highest potential terminals of the cell groups 104a to 104d (that is to say, the positive electrode side of the single battery cell 101 having the highest electric potential in the each cell group) corresponding to the integrated circuits 300a to 300d respectively. Meanwhile, the around terminals GND are connected to the lowest potential terminals of the cell groups 104a to 104d (that is to say, the negative electrode side of the single battery cell 101 having the lowest electric potential in the each cell group) corresponding to the integrated circuits 300a to 300d respectively.

The SD-SW 103 is a switch that is commonly used in a high-voltage assembled battery or the like. The SD-SW 103 is intended for preventing an operator from getting an electric shock at the time of maintenance and inspection by opening the SD-SW 103 to interrupt a current path of the assembled battery 102. If this SD-SW 103 is opened, the serial connection between the battery modules is disconnected. Therefore, even if a person touches the highest and lowest terminals of the assembled battery 102, a high voltage is not applied to a human body, and accordingly an electric shock can be prevented.

In a communication line for a command and a data signal, a command and a data signal are transmitted from the data transmission port TXD of the microcomputer 504, through a high-speed insulation element 401, to a communication receiving terminal RXD of the integrated circuit 300a corresponding to the cell group 104a on the lowest electric potential side in the assembled battery 102. In addition, in a communication line for an FF signal, an FF signal is transmitted from the FF signal output port of the microcomputer 504, through a low-speed insulation element 402, to an FF input terminal FFIN of the integrated circuit 300a.

A communication output terminal TXD of the integrated circuit 300a corresponding to the cell group 104a on the lowest electric potential side is connected through a capacitor 403 to the communication receiving terminal RXD of the integrated circuit 300b corresponding to the cell group 104b that is one rank higher in the order of electric potential. In addition, an FF output terminal FFOUT of the integrated circuit 300a is connected through the capacitor 403 to an FF input terminal FFIN of the integrated circuit 300b.

Similarly, the communication output terminal TXD and the FF output terminal FFOUT of the integrated circuit 300b are connected through the capacitors 403 respectively to the communication receiving terminal RXD and the FF input terminal FFIN of the integrated circuit 300c corresponding to the cell group 104c that is one rank higher in the order of electric potential. Further, the communication output terminal TXD and the FF output terminal FFOUT of the integrated circuit 300c are connected through the capacitors 403 respectively to the communication receiving terminal RXD and the FF input terminal FFIN of the integrated circuit 300d corresponding to the cell Group 104d that is one rank higher in the order of electric potential, in other words, corresponding to the cell group 104d on the highest electric potential side.

It should be noted that the communication between the integrated circuit 300b connected to the cell group 104b on the lower side of the SD-SW103 and the integrated circuit 300c connected to the cell group 104c on the upper side of the SD-SW103 needs to be performed with the communication lines insulated. This is because directly connecting these communication lines causes the battery modules that are arranged on the upper and lower sides of the SD-SW 103 to be connected to each other in series through the connection. In this case, even if the SD-SW 103 is separated, the serial connection between the battery modules is maintained, and therefore current carrying of the assembled battery 102 cannot be interrupted. Therefore, if the number of the single battery cells 101 contained in each cell group is large, with the result that a voltage between terminals of the each cell group is high, there arises a possibility that an operator will get an electric shock. Accordingly, in the example shown in FIG. 2, the capacitors 403 are inserted between the integrated circuit 300b and the integrated circuit 300c.

The communication output terminal TXD of the integrated circuit 300d corresponding to the cell group 104d on the highest electric potential side is connected through high-speed insulation element 401 to a data receiving port RXD of the microcomputer 504 Similarly, the FF output terminal FFOUT of the integrated circuit 300d is connected through the low-speed insulation element 402 to an FF signal input port of the microcomputer 504.

Incidentally, the high-speed insulation element 401 and the low-speed insulation element 402 that are used in each communication path between the microcomputer 504 and each of the integrated circuits 300a and 300d are collectively shown as the insulation element group 400 in FIG. 1.

When a communication signal for starting is input from the data transmission port TXD of the microcomputer 504 into the communication receiving terminal RXD of the integrated circuit 300a, the integrated circuit 300a starts according to the communication signal, and then outputs a communication signal for starting the next integrated circuit 300b. At this point of time, the integrated circuit 300a outputs a communication signal from the communication output terminal TXD, through the capacitor 403, to the communication receiving terminal RXD of the integrated circuit 300b.

When the communication signal from the integrated circuit 300a is input into the communication receiving terminal RXD, integrated circuit 300b starts according to the communication signal, and then outputs a communication signal for starting the next integrated circuit 300c in a manner similar to that of the integrated circuit 300a. In other words, the integrated circuit 300b outputs a communication signal from the communication output terminal TXD, through the capacitor 403, to the communication receiving terminal RXD of the integrated circuit 300c. Subsequently, similar operation is performed in the integrated circuit 300c too.

When the communication signal from the integrated circuit 300c is input into the communication receiving terminal RXD, with the result that the integrated circuit 300d starts, a communication signal is output from the communication output terminal TXD of the integrated circuit 300d to the data receiving port RXD of the microcomputer 504. Receiving this communication signal enables the microcomputer 504 to check starting of the integrated circuits 300a to 300d, and to determine whether or not the cell controller 200 has been started.

After the cell controller 200 starts, the microcomputer 504 transmits a command signal and data (data packet) to the receiving terminal RXD of the integrated circuit 300a through the high-speed insulation element 401. The integrated circuit 300a receives the command signal and the data packet, and then transmits the command signal and the data packet from the output terminal TXD further to the next integrated circuit 300b. All of the integrated circuits 300a to 300d each receive the command signal and the data in this manner, and each perform the operation according to the command signal and the data. When data including a voltage between terminals (referred to as "cell voltage") of each of the single battery cells 101 in the cell groups 104a to 104d that are controlled by the integrated circuits 300a to 300d respectively is obtained, each of the integrated circuits 300a to 300d adds data to the data packet, and transmits the data packet from the transmission terminal TXD to the RXD terminal of the next integrated circuit, and eventually the data packet is received by the data receiving port RXD of the microcomputer 504. By receiving the data packet including the command signal transmitted by the microcomputer 504 itself, the microcomputer 504 determines whether or not the command signal has been normally transmitted. In addition, when the data packet contains the data added by the integrated circuits 300a to 300d, the microcomputer 504 receives the data.

Incidentally, a loop of the FF signal that passes through the FF input terminals FFIN and the FF output terminals FFOUT of the respective integrated circuit 300a to 300d is a communication path for detecting a state of overcharge or over-discharge of the single battery cells 101. This communication path is intended for detecting overcharge through a line different from the communication line passing through the TXD terminals and the RXD terminals so as to increase the reliability of the overcharge detection that is important for ensuring the safety of the single battery cells 101, each of which uses the lithium-ion battery. It is assumed that the FF signal is a rectangular wave signal with a constant period. For example, it is assumed that in a normal state, the FF signal is a rectangular wave having a frequency of 1 kHz, and in an overcharge state, the FF signal is a rectangular wave having a frequency of 2 KHz.

When a rectangular wave having a frequency of 1 KHz is input into the FF input terminal FFIN, the integrated circuit 300 determines that each integrated circuit 300 in the higher communication order is in a normal state (not overcharged), and then outputs a rectangular wave having a wavelength of 1 kHz to the FF output terminal FFOUT. Meanwhile, when the integrated circuit 300 detects an overcharge voltage as a cell voltage detection value, the integrated circuit 300 outputs a rectangular wave having a wavelength of 2 kHz to the FF output terminal FFOUT irrespective of whether the frequency of the input signal of the FF input terminal FFIN is 1 kHz or 2 kHz, and then outputs an overcharge state to the next integrated circuit 300. In addition, when the frequency of the input signal of the FFIN terminal is other than 1 kHz and 2 kHz, a rectangular wave is not output to the FF output terminal FFOUT.

Even when a certain integrated circuit 300 does not detect an overcharge voltage of the single battery cells 101 in a cell group controlled by the certain integrated circuit 300, when a rectangular wave having a frequency of 2 kHz is input into the FF input terminal FFIN from another integrated circuit 300, the certain integrated circuit 300 outputs a rectangular wave having a wavelength of 2 kHz to the FF output terminal FFOUT. In this manner, the FF signal loop outputs the overcharge that has been detected by any of the integrated circuits 300. This enables the microcomputer 504 to detect overcharge by a path different from the high-speed communication signal loop.

It should be noted that the microcomputer 504 usually treats the integrated circuit 300a on the lowest electric potential side as the highest communication order, and outputs, as an FF a rectangular wave having a frequency of 1 kHz and indicating a normal state to the integrated circuit 300a. Meanwhile, when the operation of the FF loop is checked, a rectangular wave having a frequency of 2 kHz and indicating overcharge has only to be output. In other words, even when all of the integrated circuit 300a to 300d do not detect an overcharge voltage, when a rectangular wave of a returned FF signal has a frequency of 2 kHz, the microcomputer 504 is capable of determining that the FF loop is normally operating. Moreover, when a failure has occurred in the FF loop, for example, when a disconnection has occurred, a rectangular wave is not transmitted, and therefore this state can be identified.

In the battery system based on the connection method in the prior art described above, when the SD-SW 103 is opened, the ground terminals GND of the integrated circuits 300b and 300c, which are adjacent across the SD-SW 103, are insulated from each other. In this case, a communication signal cannot be transmitted via the communication path through the capacitors 403 between the integrated circuit 300b and the integrated circuit 300c, and therefore the communication is disabled. Therefore, the normal operation of the integrated circuits 300a to 300d as a whole cannot be performed, and the assembled battery 102 cannot be managed by the cell controller 200. Moreover, it is also impossible to start the cell controller 200 in the above-described method.

Accordingly, differently from the connection method in the prior art, the present invention devises a connection between the integrated circuit 300b and the integrated circuit 300c, thereby preventing the above-described inconvenience from occurring even when the SD-SW 103 is opened. Specific examples thereof will be described in the under-mentioned embodiments.

First Embodiment

Figure 3:
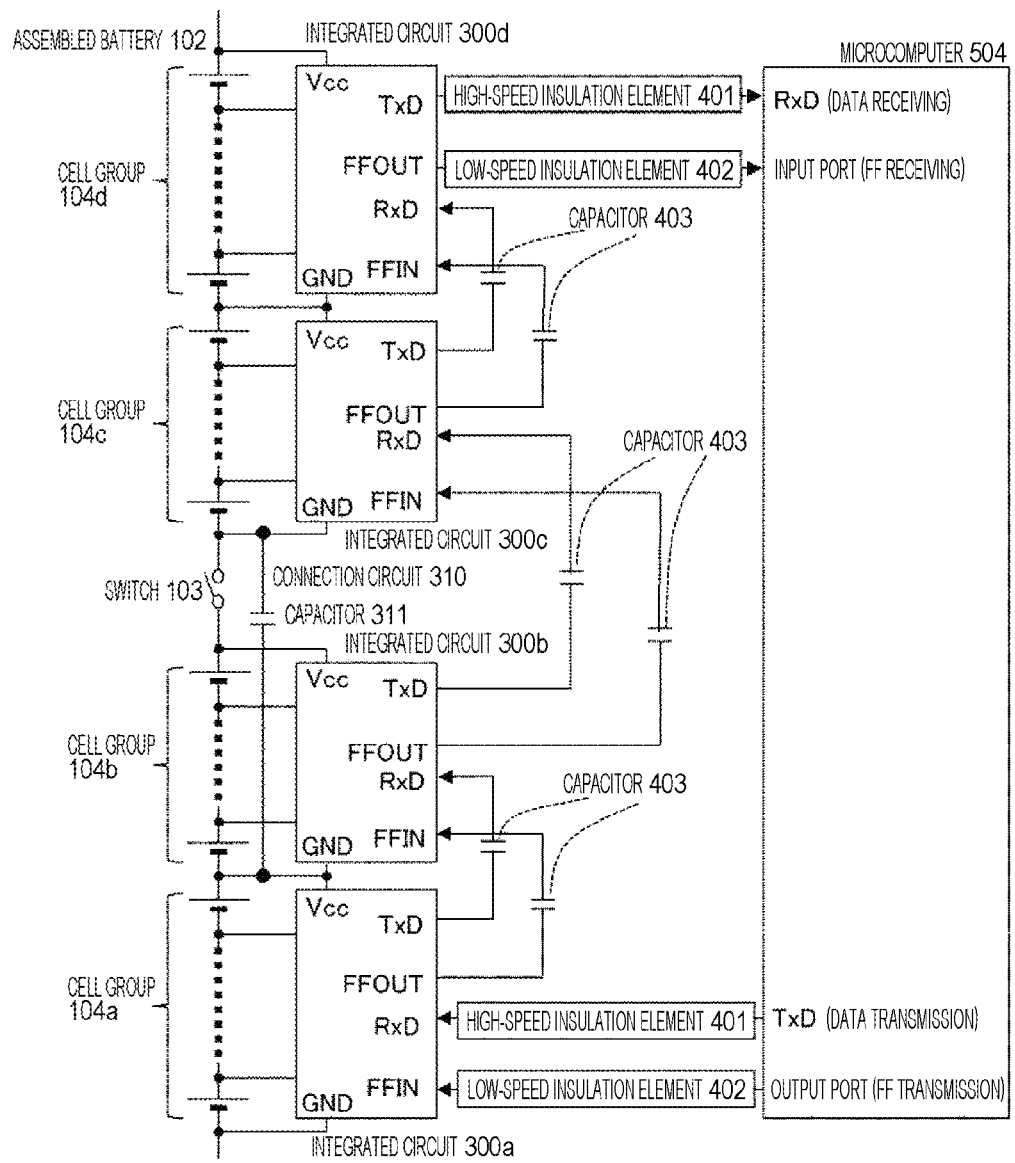
FIG. 3 is a diagram illustrating an example of communication connection according to a first embodiment of the present invention.

FIG. 3 is a diagram illustrating an example of communication connection according to a first embodiment of the present invention. Comparing with the connection method in the prior art shown in FIG. 2, a connection method shown in FIG. 3 differs therefrom in that a connection circuit 310 is provided between the integrated circuit 300b and the integrated circuit 300c.

The connection circuit 310 AC-couples the ground terminal GND of the integrated circuit 300b to the ground terminal GND of the integrated circuit 300c through the capacitor 311. This enables to transmit a communication signal between the integrated circuit 300b and the integrated circuit 300c through the capacitors 403 even when the SD-SW 103 is opened.

Here, it is preferable that the integrated circuit 300b on the transmission side output a communication signal from the communication output terminal TXD with the electric potential on the negative electrode side of the single battery cell 101 to which the ground terminal GND is connected in the corresponding cell group 104b used as a reference electric potential of the communication signal. In addition, it is preferable that the integrated circuit 300c on the receiving side receive a communication signal input into the communication receiving terminal RXD with the electric potential on the negative electrode side of the single battery cell 101 to which the ground terminal GND is connected in the corresponding cell group 104c used as a reference electric potential. The connection method shown in FIG. 3 is particularly effective for the transmission of the communication signal in such a case.

According to the first embodiment of the present invention described above, the cell controller 200 is provided with: the integrated circuits 300b and 300c; a signal transmission path through which a signal is transmitted between the integrated circuit 300b and the integrated circuit 300c via the capacitor 403; and the connection circuit 310. The integrated circuit 300b measures respective voltages of the plurality of single battery cells 101 that are provided corresponding to the cell group 104b electrically connected to one side of the SD-SW 103 functioning as an interruption mechanism for interrupting the electric connection, and that constitute the cell group 104b. The integrated circuit 300c measures respective voltages of the plurality of single battery cells 101 that are provided corresponding to the cell group 104c electrically connected to the other side of the SD-SW 103, and that constitute the cell group 104c. The connection circuit 310 AC-couples a coupling target terminal of the integrated circuit 300b, which is electrically connected to any of the single battery cells 101 of the cell group 104b, to a coupling target terminal of the integrated circuit 300c, which is electrically connected to any of the single battery cells 101 of the cell group 104c, through the capacitor 311. More specifically, the connection circuit 310 AC-couples the ground terminal GND of the integrated circuit 300b and the ground terminal GND of the integrated circuit 300c to each other as the respective coupling target terminals. The around terminal GND that is the coupling target terminal of the integrated circuit 300b is connected to the negative electrode side of the battery cell having the lowest electric potential in the cell group 104b; and the ground terminal GND that is the coupling target terminal of the integrated circuit 300c is connected to the negative electrode side of the battery cell having the lowest electric potential in the cell group 104c. Configuring the connection method in this manner enables to operate the integrated circuits 300a to 300d, each of which is connected to the single battery cells 101, even when the SD-SW 103 is opened.

Second Embodiment

Figure 4:
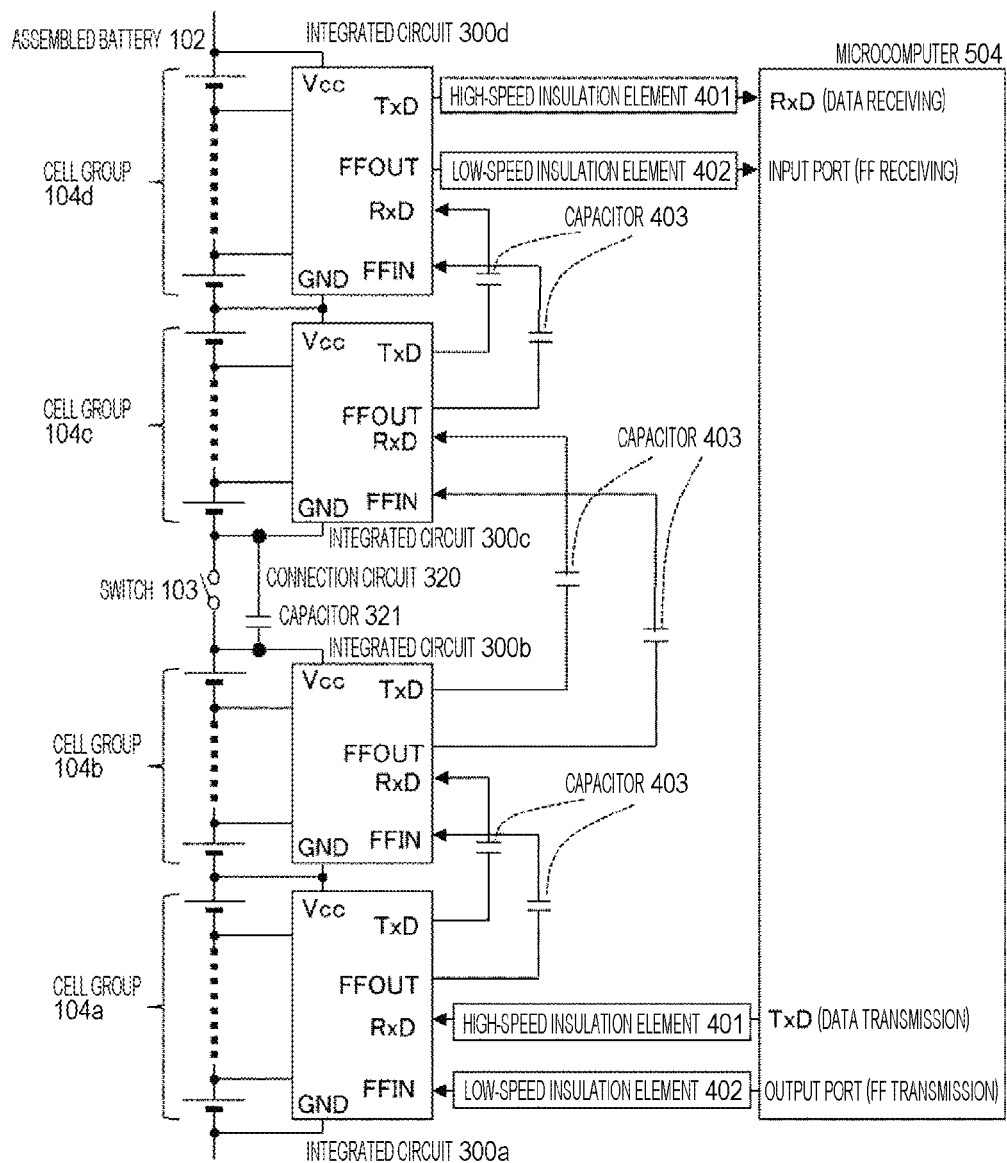
FIG. 4 is a diagram illustrating an example of communication connection according to a second embodiment of the present invention.

FIG. 4 is a diagram illustrating an example of communication connection according to a second embodiment of the present invention. In the connection method shown in FIG. 4, the connection circuit 320 is provided between the integrated circuit 300b and the integrated circuit 300c as an alternative to the connection circuit 310 in the first embodiment shown in FIG. 3.

The connection circuit 320 AC-couples the power terminal Vcc of the integrated circuit 300b to the ground terminal GND of the integrated circuit 300c through a capacitor 321. As with the first embodiment, this enables to transmit a communication signal between the integrated circuit 300b and the integrated circuit 300c through the capacitors 403 even when the SD-SW 103 is opened.

Here, it is preferable that the integrated circuit 300b on the transmission side output a communication signal from the communication output terminal TXD with the electric potential on the positive electrode side of the single battery cell 101 to which the Power terminal Vcc is connected in the corresponding cell group 104b used as a reference electric potential of the communication signal. In addition, it is preferable that the integrated circuit 300c on the receiving side receive a communication signal input into the communication receiving terminal RXD with the electric potential on the negative electrode side of the single battery cell 101 to which the ground terminal GND is connected in the corresponding cell group 104c used as a reference electric potential. The connection method shown in FIG. 4 is particularly effective for the transmission of the communication signal in such a case.

Alternatively, as with the first embodiment, in a case where the integrated circuit 300b outputs a communication signal with the electric potential on the negative electrode side of the single battery cell 101 to which the ground terminal GND of the integrated circuit 300b is connected used as a reference electric potential, the connection method according to the present embodiment shown in FIG. 4 may be applied. In this case, an impedance equivalent to total internal resistance of the single battery cells 101 of the cell group 104b is inserted in series into the communication path between the integrated circuit 300b and the integrated circuit 300c. However, if this impedance is sufficiently low with respect to the frequency of the communication signal, the communication signal can be normally transmitted from the integrated circuit 300b to the integrated circuit 300c.

According to the second embodiment of the present invention described above, the connection circuit 320 AC-couples a coupling target terminal of the integrated circuit 300b, which is electrically connected to any of the single battery cells 101 of the cell group 104b, to a coupling target terminal of the integrated circuit 300c, which is electrically connected to any of the single battery cells 101 of the cell group 104c, through the capacitor 321. More specifically, the connection circuit 320 AC-couples the power terminal Vcc of the integrated circuit 300b and the ground terminal GND of the integrated circuit 300c to each other as the respective coupling target terminals. The power terminal Vcc that is the coupling target terminal of the integrated circuit 300b is connected to the positive electrode side of the battery cell having the highest electric potential in the cell group 104b; and the ground terminal GND that is the coupling target terminal of the integrated circuit 300c is connected to the negative electrode side of the battery cell having the lowest electric potential in the cell group 104c. As with the first embodiment, configuring the connection method in this manner enables to operate the integrated circuits 300a to 300d, each of which is connected to the single battery cells 101, even when the SD-SW 103 is opened.

Third Embodiment

Figure 5:
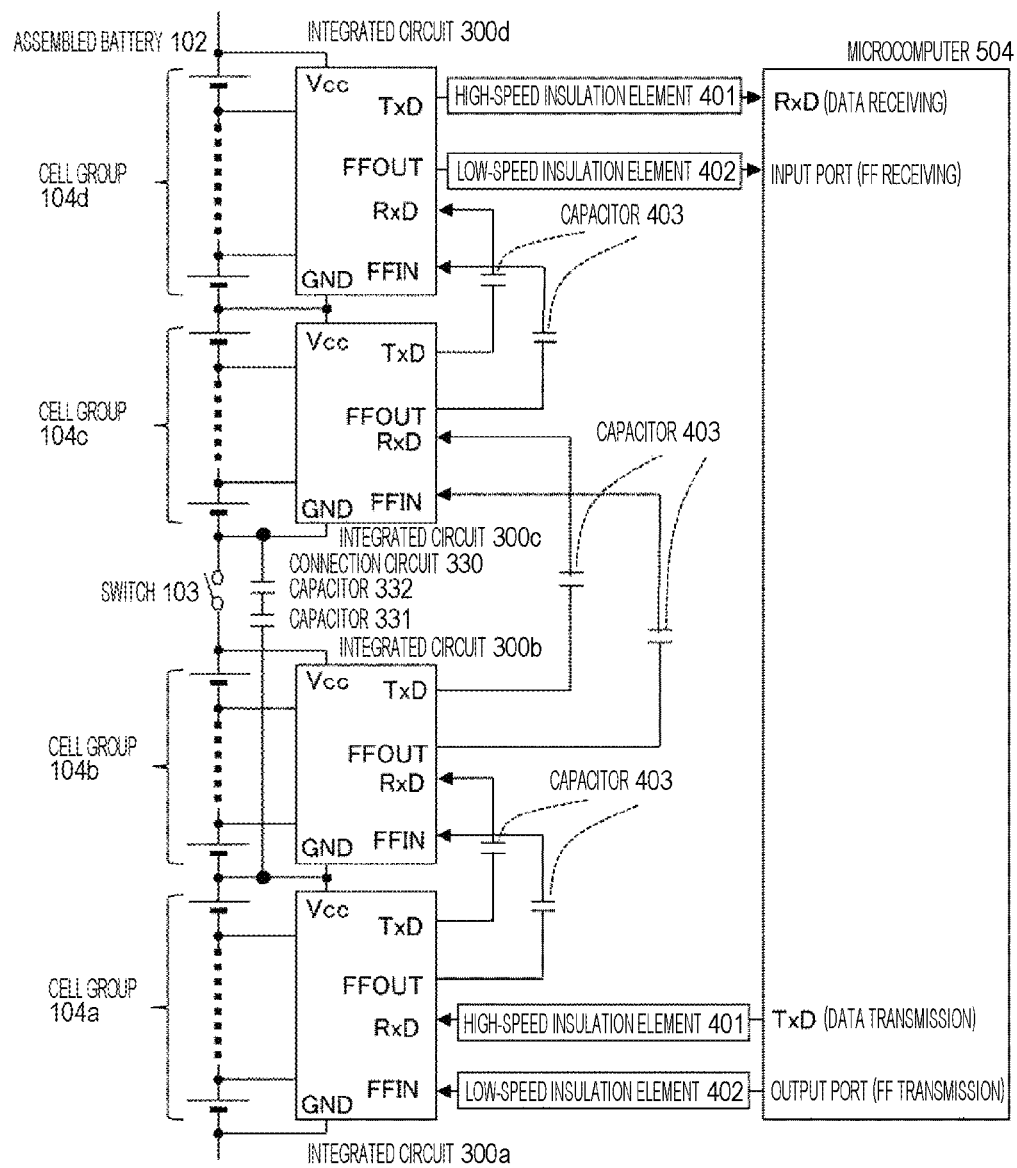
FIG. 5 is a diagram illustrating an example of communication connection according to a third embodiment of the Present invention.

FIG. 5 is a diagram illustrating an example of communication connection according to a third embodiment of the present invention. In the connection method shown in FIG. 5, the connection circuit 330 is provided between the integrated circuit 300b and the integrated circuit 300c as an alternative to the connection circuit 310 in the first embodiment shown in FIG. 3.

The connection circuit 330 AC-couples the ground terminal GND of the integrated circuit 300b to the ground terminal GND of the integrated circuit 300c through two capacitors 331 and 332 that are connected in series. As with the first embodiment, this enables to transmit a communication signal between the integrated circuit 300b and the integrated circuit 300c through the capacitors 403 even when the SD-SW 103 is opened. Moreover, even when either one of the capacitors 331, 332 is short-circuited due to a failure or the like, the cell group 104b can be prevented from being short-circuited through the connection circuit 330. Therefore, an improvement in safety can be achieved.

It should be noted that although the two capacitors 331 and 332 are connected in series in FIG. 5, three or more capacitors may be connected in series. In addition, as with the second embodiment, the power terminal Vcc of the integrated circuit 300b may be AC-coupled to the ground terminal GND of the integrated circuit 300c by using the connection circuit 330.

According to the third embodiment of the present invention described above, the connection circuit 330 AC-couples the ground terminal GND of the integrated circuit 300b and the ground terminal GND of the integrated circuit 300c to each other as the respective coupling target terminals through the plurality of capacitors 331 and 332. As with the first and second embodiments, configuring the connection method in this manner enables to operate the integrated circuits 300a to 300d, each of which is connected to the single battery cells 101, even when the SD-SW 103 is opened. Moreover, an improvement in safety can also be achieved by preventing the cell Group 104b from being short-circuited.

Fourth Embodiment

Figure 6:
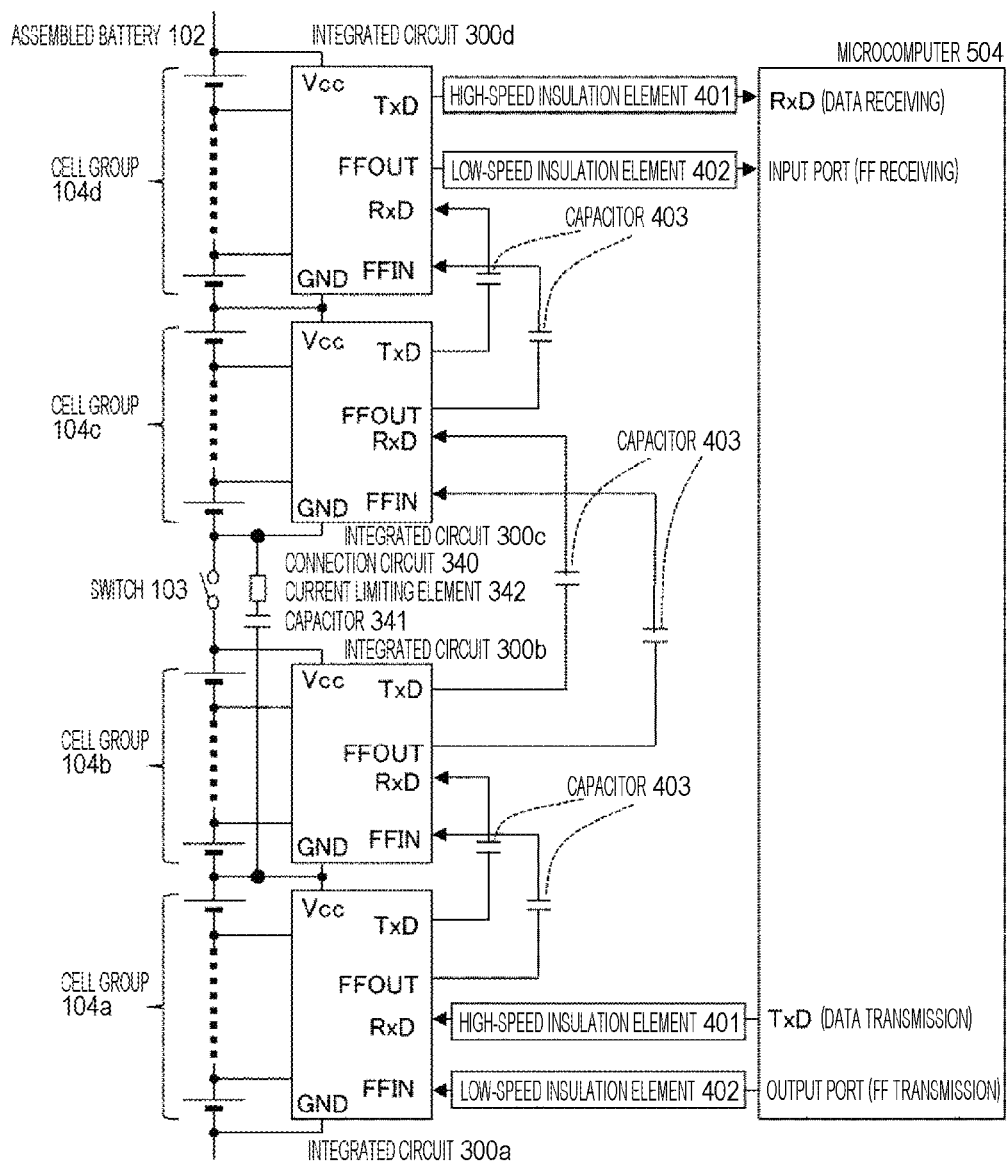
FIG. 6 is a diagram illustrating an example of communication connection according to a fourth embodiment of the present invention.

FIG. 6 is a diagram illustrating an example of communication connection according to a fourth embodiment of the present invention. In the connection method shown in FIG. 6, the connection circuit 340 is provided between the integrated circuit 300b and the integrated circuit 300c as an alternative to the connection circuit 310 in the first embodiment shown in FIG. 3.

The connection circuit 340 AC-couples the ground terminal GND of the integrated circuit 300b to the ground terminal GND of the integrated circuit 300c through the capacitor 341. A current limiting element 342 that uses a resistance or the like is connected to the capacitor 341 in series. As with the first embodiment, this enables to transmit a communication signal between the integrated circuit 300b and the integrated circuit 300c through the capacitors 403 even when the SD-SW 103 is opened. Moreover, when the capacitor 341 is short-circuited due to a failure or the like, a current flowing through the connection circuit 340 is limited by the current limiting element 342, thereby enabling to prevent an excessive current from flowing. Therefore, an improvement in safety can be achieved.

It should be noted that although the connection circuit 340 AC-couples the ground terminal GND of the integrated circuit 300b to the ground terminal GND of the integrated circuit 300c in FIG. 6, the power terminal Vcc of the integrated circuit 300b may be AC-coupled to the ground terminal GND of the integrated circuit 300c as with the second embodiment.

According to the fourth embodiment of the present invention described above, the connection circuit 340 AC-couples the ground terminal GND of the integrated circuit 300b and the ground terminal GND of the integrated circuit 300c to each other as the respective coupling target terminals through the capacitor 341. The connection circuit 340 further includes the current limiting element 342 that is connected to the capacitor 341 in series. As with the first to third embodiments, configuring the connection method in this manner enables to operate the integrated circuits 300a to 300d, each of which is connected to the single battery cells 101, even when the SD-SW 103 is opened. Moreover, an improvement in safety can also be achieved by preventing an excessive current from flowing when the capacitor 341 is short-circuited.

Incidentally, in each embodiment of the present invention described above, the connection circuit 310, 320, 330 or 340 that is provided with at least one capacitor is connected between the ground terminal GND or the power terminal Vcc of the integrated circuit 300b and the ground terminal GND of the integrated circuit 300c. Therefore, decreasing an AC impedance between the integrated circuit 300b and the integrated circuit 300c enables to enhance the noise immunity of a communication signal to be transmitted and received therebetween. For example, it is possible to reduce noise components occurring when a ripple voltage or the like that has occurred by the operation of the inverter 700 shown in FIG. 1 are superimposed on a communication signal. Therefore, the present invention is effective from the viewpoint of an improvement in operational reliability of the cell controller 200 as well.

The scope of the present invention is not limited to the battery systems having configurations such as that described in the above-described embodiments. The present invention can be applied to battery systems having various configurations, and electrically driven vehicles having various specifications.

The above-described embodiments and the above-described modified examples are nothing but examples, and the present invention is not limited to the contents thereof unless the features of the invention are impaired.

REFERENCE SIGNS LIST

100 Battery system
101 Single battery cell
102 Assembled battery
102a to 102d Cell group
103 Service disconnect switch (SD-SW)
104a to 104d Cell group
200 Cell controller
300, 300a to 300d Integrated circuit
310, 320, 330, 340 Connection circuit
311, 321, 331, 332, 341 Capacitor
342 Current limiting element
400 Insulation element group
401 High-speed insulation element
402 Low-speed insulation element
403 Capacitor
500 Battery controller
501 Total-voltage detection circuit
502 Charging/discharging current detection circuit
503 Current sensor
504 Microcomputer 600 Relay
610 Relay
700 Inverter
701 Total-voltage detection circuit
800 Motor

The invention claimed is:

1. A battery management device comprising:
a first integrated circuit that is provided corresponding to a first battery cell group electrically connected to one side of an interruption mechanism for interrupting an electric connection, and measures respective voltages of a plurality of battery cells constituting the first battery cell group;
a second integrated circuit that is provided corresponding to a second battery cell group electrically connected to the other side of the interruption mechanism, and measures respective voltages of a plurality of battery cells constituting the second battery cell group;
a signal transmission path through which a signal is transmitted between the first integrated circuit and the second integrated circuit; and
a connection circuit that AC-couples a coupling target terminal of the first integrated circuit, which is electrically connected to any of the battery cells of the first battery cell group, to a coupling target terminal of the second integrated circuit, which is electrically connected to any of the battery cells of the second battery cell group, through a capacitor, wherein an electric potential of the coupling target terminal of the first integrated circuit being a reference electric potential of a transmission terminal of the first integrated circuit used as a reference electric potential of a communication signal that is transmitted as the signal to the second integrated circuit through the signal transmission path, and
an electric potential of the coupling target terminal of the second integrated circuit being a reference electric potential of a receiving terminal of the second integrated circuit that receives the signal transmitted from the first integrated circuit through the signal transmission path.

2. The battery management device according to claim 1, wherein
the coupling target terminal of the first integrated circuit is connected to the negative electrode side of a battery cell having the lowest electric potential in the first battery cell group, and
the coupling target terminal of the second integrated circuit is connected to the negative electrode side of a battery cell having the lowest electric potential in the second battery cell group.

3. The battery management device according to claim 1, wherein
the coupling target terminal of the first integrated circuit is connected to the positive electrode side of a battery cell having the highest electric potential in the first battery cell group, and
the coupling target terminal of the second integrated circuit is connected to the negative electrode side of a battery cell having the lowest electric potential in the second battery cell group.

4. The battery management device according to claim 1, wherein
the connection circuit AC-couples the coupling target terminal of the first integrated circuit to the coupling target terminal of the second integrated circuit through a plurality of capacitors that are connected in series.

5. The battery management device according to claim 1, wherein
the connection circuit includes a current limiting element that is connected to the capacitor in series.

* * * * *